(12) United States Patent
Mozumdar et al.

(10) Patent No.: US 12,325,538 B2
(45) Date of Patent: Jun. 10, 2025

(54) FRAMEWORK FOR INTERFACING BLOCKCHAIN-BASED GROUND SYSTEM WITH FLIGHT SOFTWARE AND SATELLITE ORBIT ANALYSIS APPLICATIONS

(71) Applicant: The Aerospace Corporation, El Segundo, CA (US)

(72) Inventors: Mohammad Mozumdar, Cypress, CA (US); Phanitta Chomsinsap, Buena Park, CA (US); Sadiq Sarwar, Artesia, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 374 days.

(21) Appl. No.: 17/828,819

(22) Filed: May 31, 2022

(65) Prior Publication Data
US 2023/0382567 A1    Nov. 30, 2023

(51) Int. Cl.
*B64G 3/00*      (2006.01)
*B64G 1/10*      (2006.01)
*H04L 9/00*      (2022.01)

(52) U.S. Cl.
CPC ............. *B64G 3/00* (2013.01); *B64G 1/1085* (2013.01); *H04L 9/50* (2022.05)

(58) Field of Classification Search
CPC .......... B64G 1/00; B64G 1/1085; B64G 3/10; H04L 9/50
See application file for complete search history.

(56) References Cited

U.S. PATENT DOCUMENTS

| | | |
|---|---|---|
| 10,291,316 B1 | 5/2019 | Schloemer |
| 10,592,843 B2 | 3/2020 | Natarajan et al. |

(Continued)

FOREIGN PATENT DOCUMENTS

| | | |
|---|---|---|
| WO | 2019156693 A1 | 8/2019 |
| WO | 2019200199 A1 | 10/2019 |

OTHER PUBLICATIONS

Ball Aerospace Cosmos, The User Interface for Command and Control of Embedded Systems, https://cosmosc2.com.

(Continued)

*Primary Examiner* — Adnan M Mirza
(74) *Attorney, Agent, or Firm* — LeonardPatel PC

(57) ABSTRACT

A framework for interfacing a blockchain-based ground system with flight software and satellite orbit analysis applications is disclosed. A blockchain application (e.g., a web application) for secure management of satellites has three components—a client, a server, and a private and permissioned-based blockchain network (e.g., a Hyperledger Fabric™ network). The client allows users to configure satellite parameters. The server facilitates the communication between the client and the blockchain. The blockchain allows the secure management and storage of satellite configuration data on blockchain ledgers. For instance, SECCON provides a blockchain-based framework that can be a potential candidate for next generation ground system applications. SECCON allows secure configuration management of satellites, and has been interfaced with OpenSatKit, a software tool kit that can interact with the cFS. SECCON also provides secure communication of orbital data between trusted organizations and allows the satellite configuration parameters to be exported and viewed in SOAP.

19 Claims, 13 Drawing Sheets

(56) References Cited

U.S. PATENT DOCUMENTS

| | | | | |
|---|---|---|---|---|
| 11,447,273 | B1* | 9/2022 | Sherman | ............ H04B 7/18513 |
| 2017/0147975 | A1 | 5/2017 | Natarajan et al. | |
| 2018/0053161 | A1 | 2/2018 | Bordash et al. | |
| 2020/0242595 | A1* | 7/2020 | Harrison | ............ H04L 67/1097 |

OTHER PUBLICATIONS

Beaujardiere, et al, "Blockchain Application Within a Multi-Sensor Satellite Architecture", IEEE IGARSS 2019 Paper #5097.

Boyle, Alan, "How Satellites and Blockchain Go Together", GeekWire; https://www.geekwire.com/2019/satellites-blockchain-go-together/.

Cao, et al., "A Blockchain-Based Access Control and Intrusion Detection Framework for Satellite Communications Systems", Computer Communications 172 (2021) 216-225.

Code 582 Flight Software Systems Branch, Core Flight System (CFS) Health and Safety (HS) Version 2.3.0.0, 2016.

Cohen, Aaron, "Where Does Blockchain Technology Fit Within the Aerospace Industry?", https://medium.com/@aaronxcohen/where-does-blockchain-technology-fit-within-the-aerospace-industry-6747e0332bfb.

Graf, et al., "Neural Network and Blockchain Based Technique for Cyber Threat Intelligence and Situational Awareness", 2018 10th International Conference on Cyber Conflict.

Hyland-Wood, et al., "Blockchain Properties for Near-Planetary, Interplanetary, and Metaplanetary Space Domains", Journal of Aerospace Information Systems, vol. 17, No. 10, Oct. 2020.

Hyland-Wood, et al., "Methods for Securing Spacecraft Tasking and Control via an Enterprise Ethereum Blockchain", 37th International Communications Satellite Systems Conference (ICSSC 2019), Naha, Okinawa, Japan, 2019.

Hyperledger Fabric, "A Blockchain Platform for the Enterprise", https://hyperledger-fabric.readthedocs.io/en/release-2.0/whatis.html. [Accessed Jan. 6, 2021].

Jones, Karen L., "Blockchain in the Space Sector", Center for Space Policy and Strategy, Game Changer, Mar. 2020.

McComas, David, "Increasing Flight Software Reuse with OpenSatKit", https://github.com/OpenSatKit/OpenSatKit/wiki. [Accessed Jan. 6, 2021].

Molesky, et al., "Blockchain Network for Space Object Location Gathering", 2018 IEEE 9th Annual Information Technology, Electronics and Mobile Communication Conference (IEMCON), Vancouver, BC, Canada, 2018.

NASA, Goddard Space Flight Center, Core Flight System: A Paradigm Shift in Flight Software.

National Security Agency | Central Security Service, "Commercial National Security Algorithm Suite," [Online]. Available: https://apps.nsa.gov/iad/programs/iad-initiatives/cnsa-suite.cfm. [Accessed Jan. 6, 2021].

OpenSatKit, Available: https://github.com/OpenSatKit/OpenSatKit/wiki. [Accessed Jan. 6, 2021].

PWC, "Blockchain: What are the Applications for the Space Industry?", Feb. 2019, www.pwc.fr/space.

Space Chain Community-Based Space Platform, Version 2.4, Mar. 2020.

Surdi, Swapnil Anil, "Space Situational Awareness Through Blockchain Technology", First International Orbital Debris Conference, 2019.

Surdi, Swapnil Anil, "Space Situational Awareness Through Blockchain Technology", Space Safety Engineering, vol. 7, No. 3, pp. 295-301, 2020.

The Aerospace Corporation, Space and Technology Government Customer Course Catalog, 2019.

Torky, et al, "Blockchain in Space Industry—Challenges and Solutions", Scientific Research Group in Egypt (SRGE), Cairo, Egypt, https://arxiv.org/ftp/arxiv/papers/2002/2002.12878.pdf. [Accessed Jan. 6, 2021].

Torky, et al., "Blockchain in Space Industry—Challenges and Solutions", Scientific Research Group in Egypt (SRGE), Cairo.

Werner, Debra, "Sure, there's Hype. But Blockchain has concrete space applications", Space News, Nov. 15, 2021.

Xu, et al., "An Exploration of Blockchain Enabled Decentralized Capability based Access Control Strategy for Space Situation Awareness", Dec. 24, 2018.

Xu, et al., "An Exploration of Blockchain Enabled Decentralized Capability Based Access Control Strategy for Space Situation Awareness", Optical Engineering, vol. 58, No. 4, 2019.

Yu, et al., "Smart Communications in Heterogeneous Spacecraft Networks: A Blockchain Based Secure Auction Approach", 2019 IEEE Cognitive Communications for Aerospace Applications Workshop (CCAAW), Cleveland, OH, USA, 2019.

* cited by examiner

300

Web Application Client — 310

↓ Send Request to Server App   ↑ Send Response to Client App

Web Application Server — 320

↓ Invoke Smart Contract Method   ↑ Send Response to Server App

Hyperledger Fabric™ Network — 330

500

800

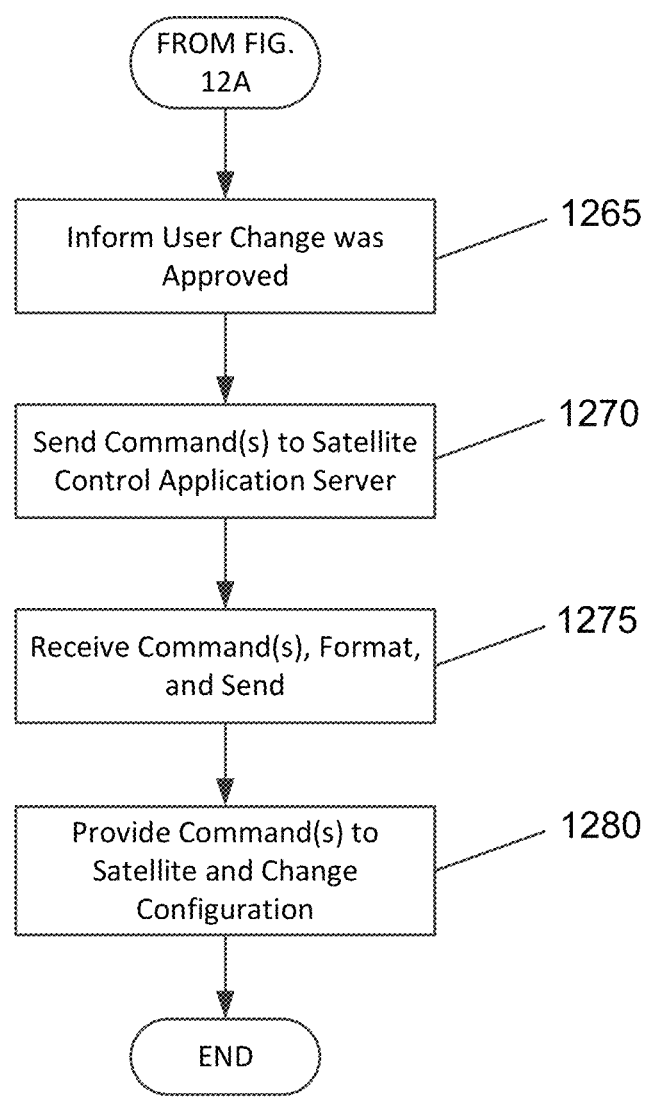

FRAMEWORK FOR INTERFACING BLOCKCHAIN-BASED GROUND SYSTEM WITH FLIGHT SOFTWARE AND SATELLITE ORBIT ANALYSIS APPLICATIONS

FIELD

The present invention generally relates to space systems, and more specifically, to a framework for interfacing a blockchain-based ground system with flight software and satellite orbit analysis applications.

BACKGROUND

Security and threat prevention are the main objectives for cyber applications and procedures. Hackers, whether individuals, part of a non-government group, or state actors, frequently try to breach system security and obtain data. Such cyberattacks can occur on a local, regional, or global scale. With advancements in technology, the number of cyber threats continually increases. Hence, there is a need for reliable data security and privacy.

Blockchain technologies may provide trust, security, and traceability. Blockchain was initially created for digital transactions using cryptocurrency. However, blockchain technologies and applications have grown beyond this scope, and have proved to be a powerful mechanism for many applications, such as providing secure data storage and sharing.

Blockchain uses distributed and decentralized ledger technology. This means that the blockchain is shared through multiple systems, and there is no single point of authority. Blockchain consists of many "blocks" of transactions (or recorded information) linked to one another using hashing. When a new block is added to the blockchain, this block contains a hash of the previous "new" block. Therefore, there is always a reference from one block to the previous block. Since blockchain ledgers are typically duplicated and distributed on a network of nodes across multiple systems, crashing the network becomes increasingly difficult as the number of blocks increases.

There are different consensus algorithms that can be used to validate the transaction order for how blocks are stored and for the correctness of the transactions themselves. Based on the consensus algorithms used, different levels of security and performance are acquired. These attributes of the blockchain ensure data immutability and transparency in transactions. A "Hyperledger" is an umbrella to open source blockchain projects and tools. Hyperledger Fabric™ is one of the frameworks of the Linux Foundation® for a private and permissioned blockchain.

The Hyperledger Fabric™ network (N) consists of many components including channels (C), peer nodes (P), ledgers (L), orderer nodes (O), smart contracts (S), and certificate authorities (CA). See Hyperledger Fabric™ architecture 100 of FIG. 1.

The Hyperledger Fabric™ network facilitates secure communication and data sharing among trusted organizations. Channels, or subnetworks, are used for data access control and privacy. Peer nodes are the fundamental elements in the Hyperledger Fabric™ network that maintain the copy of the ledgers. Ledgers include the world state (or current state) of the data and the blockchain, which includes past transactions. Orderer nodes order the sequence of transactions on the blockchain. Data access control can also be implemented via smart contracts, which are transaction protocols that define how transactions should be executed. The certificate authority is used to issue certificates for organization members. Client applications (A), which reside outside of the network, can be connected to channels to perform transactions and access the blockchain data if given the appropriate permissions. The Hyperledger Fabric™ network is also dynamically configurable, which means the network can be scaled to have more nodes, channels, and applications. These characteristics of the Hyperledger Fabric™ are appealing for multiparty data security.

In space systems, satellites, ground stations, processing centers, etc. are present. These components are typically owned and managed by multiple organizations. Since multiple parties are involved, secure data sharing and communication should be ensured for a successful mission, but this task is currently complex and non-uniform from one space system to another. Accordingly, an improved and/or alternative approach may be beneficial.

SUMMARY

Certain embodiments of the present invention may provide alternatives or solutions to the problems and needs in the art that have not yet been fully identified, appreciated, or solved by current space system security technologies. For example, some embodiments of the present invention pertain to a framework for interfacing a blockchain-based ground system with flight software and satellite orbit analysis applications.

In an embodiment, a system includes a first computing system. The first computing system includes memory storing computer program instructions for a web application client, a web application server, and a blockchain ledger application. The first computing system also includes at least one processor configured to execute the computer program instructions. The computer program instructions are configured to cause the at least one processor to display, by the web application client, an interface for secure viewing and management of satellite configurations. The interface includes satellite configuration data. The computer program instructions are also configured to cause the at least one processor to facilitate communication between the web client application and the blockchain ledger application, by the web server application. The computer program instructions are further configured to cause the at least one processor to provide secure management and storage of satellite configuration data on one or more blockchain ledgers, by the blockchain ledger application.

In another embodiment, a computing system includes memory storing computer program instructions for a web application client, a web application server, and a blockchain ledger application. The computing system also includes at least one processor configured to execute the computer program instructions. The computer program instructions are configured to cause the at least one processor to display, by the web application client, an interface for secure viewing and management of satellite configurations. The interface includes satellite configuration data. The computer program instructions are also configured to cause the at least one processor to facilitate communication between the web client application and the blockchain ledger application, by the web server application. The computer program instructions are further configured to cause the at least one processor to provide secure management and storage of satellite configuration data on one or more blockchain ledgers, by the blockchain ledger application.

In yet another embodiment, a non-transitory computer-readable medium stores computer program code. The computer program code is configured to cause at least one processor to display an interface of a web application client for secure viewing and management of satellite configurations. The interface includes satellite configuration data. The computer program code is also configured to cause at least one processor to facilitate communication via a web server application between the web client application and a blockchain ledger application. The computer program code is further configured to cause at least one processor to provide secure management and storage of satellite configuration data on one or more blockchain ledgers via the blockchain ledger application.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 12A and 12B provide a flowchart illustrating a process for interfacing a blockchain-based ground system with flight software and satellite orbit analysis applications, according to an embodiment of the present invention.

Unless otherwise indicated, similar reference characters denote corresponding features consistently throughout the attached drawings.

DETAILED DESCRIPTION OF THE EMBODIMENTS

Some embodiments pertain to a framework for interfacing a blockchain-based ground system with flight software and satellite orbit analysis applications. A blockchain application (e.g., a web application) for secure management of satellites has three components in some embodiments—a client, a server, and a Hyperledger Fabric™ network (or blockchain). However, any suitable distributed blockchain network that provides private and permissioned blockchain capabilities may be used without deviating from the scope of the invention. The client allows users to configure satellite parameters. The server facilitates the communication between the client and the blockchain. The blockchain allows the secure management and storage of satellite configuration data on blockchain ledgers.

The framework of some embodiments may be interfaced with existing space applications, such as Core Flight System (cFS) from NASA® and the Satellite Orbit Analysis Program (SOAP) software from The Aerospace Corporation®. Multiple advantages are realized by interfacing a blockchain application with a space application such as cFS. For instance, blockchain capabilities can be integrated with existing satellite command and control systems to provide improved security. Also, the immutable transactions of the blockchain can be used to securely track ground commands sent to space systems, such as satellites. For instance, SECCON provides a blockchain-based framework that can be a potential candidate for next generation ground system applications. SECCON allows secure configuration management of satellites, and has been interfaced with OpenSatKit, a software tool kit that can interact with the cFS. SECCON also provides secure communication of orbital data between trusted organizations and allows the satellite configuration parameters to be exported and viewed in SOAP, which is a three-dimensional (3D) orbit analysis and visualization tool.

Previous work has used blockchain technology for space detection and exploration. However, blockchain technology has not been applied for secure satellite and spacecraft command configurations, or for providing secure communication of orbital data between multiple organizations. Some embodiments provide this functionality.

Architecture

Figure 1:
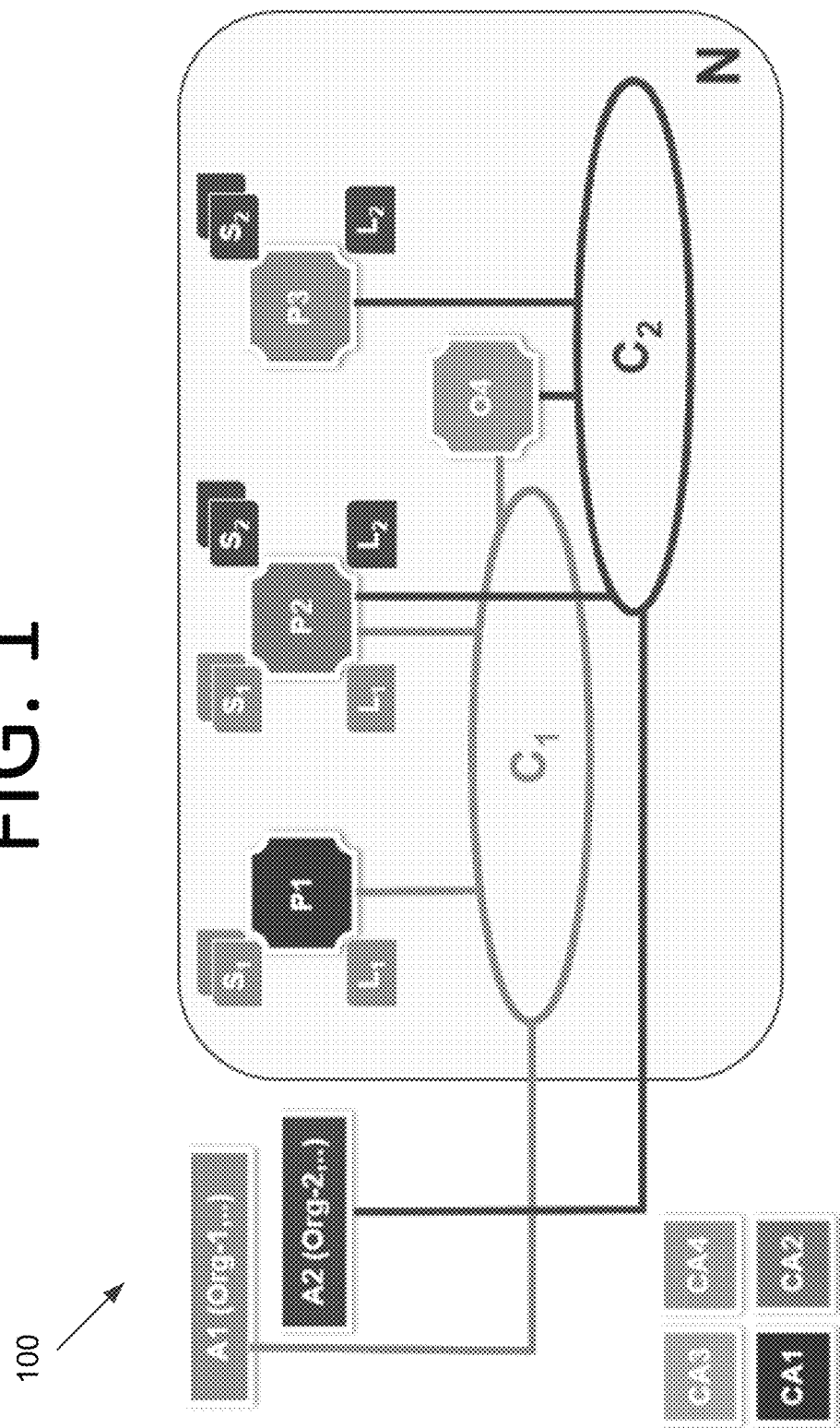
FIG. 1 is an architectural diagram illustrating a Hyperledger Fabric™ network.
Figure 2:
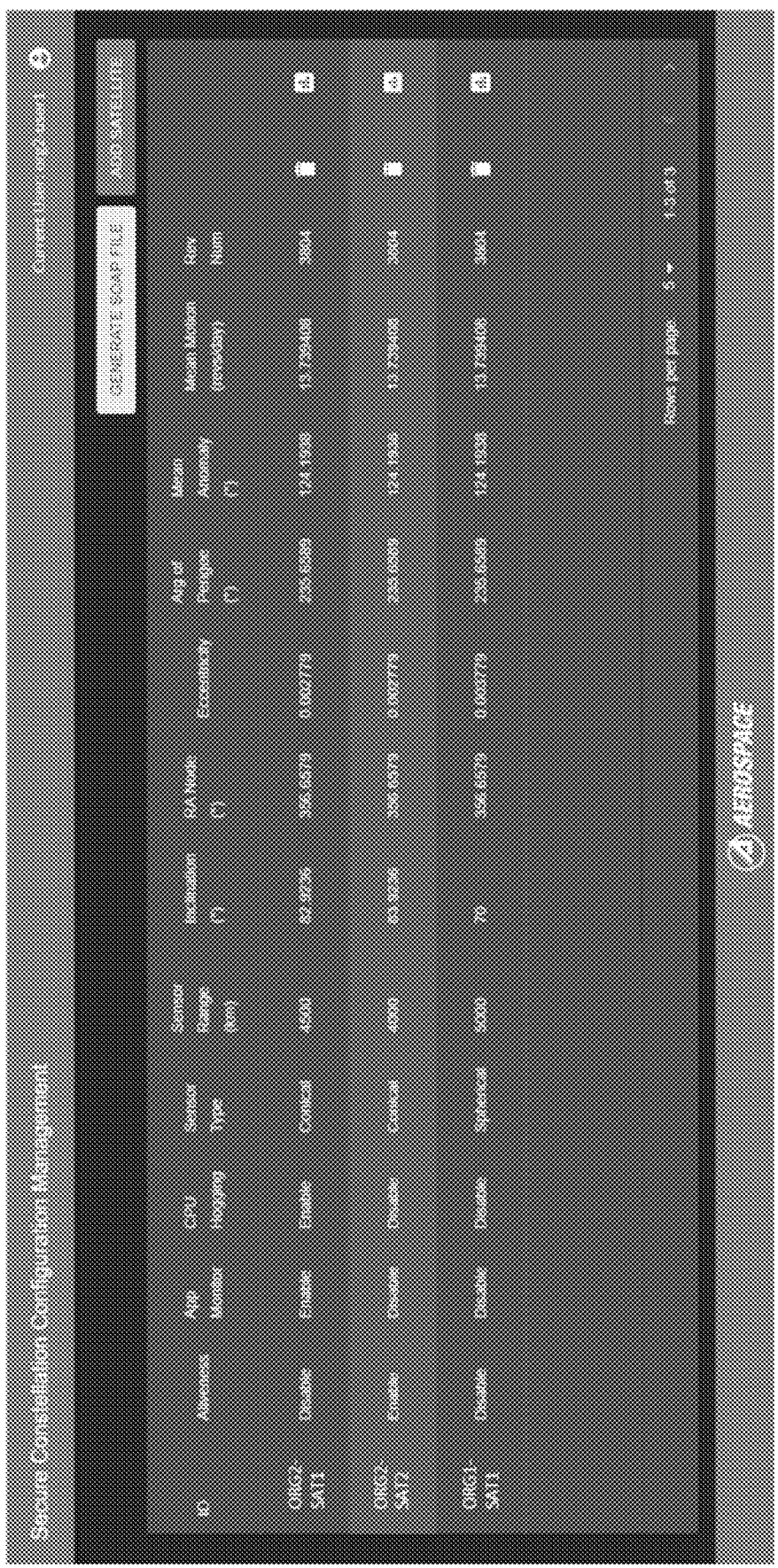
FIG. 2 is a screenshot illustrating an interactive web client that facilitates configuration of satellite parameters, according to an embodiment of the present invention.

A blockchain web application for secure configuration management of satellites is provided in some embodiments. The Hyperledger Fabric™ framework from The Linux Foundation® may be utilized to provide private and permissioned blockchain capabilities for secure access control and data management. This framework includes an interactive web client that users of a particular organization can readily use to configure satellite parameters. See screenshot 200 of FIG. 2. The configurations displayed on the client are connected to a backend server and blockchain for data communication.

Figure 3:
FIG. 3 is an architectural diagram illustrating operation of a secure constellation configuration management (SECCON) framework, according to an embodiment of the present invention.
Figure 3:
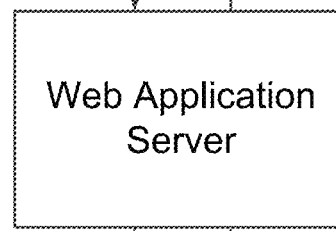
Figure 3:
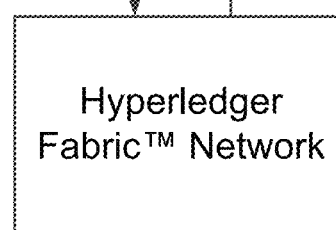

The framework of some embodiments is integrated with an Identity and Access Management (IdAM) solution (e.g., Keycloak™) to allow single sign-on with IdAM across organizations on the blockchain network, an interactive 3D orbit visualization and analysis tool (e.g., SOAP), and a flight software application (e.g., OpenSatKit). Referring to FIG. 3, framework 300 includes three main components in some embodiments—a web application client 310, a web application server 320, and a Hyperledger Fabric™ network 330. Web applicant client 310 is a Node.js application in some embodiments and allows authorized users to securely view and manage satellite configurations from a web browser. Web application server 320 is also a Node.js application in some embodiments and facilitates the communication between the web-app client and the Hyperledger Fabric™ network (or blockchain). Hyperledger Fabric™ network 330 facilitates secure management and storage of satellite configuration data on blockchain ledgers.

Hyperledger Fabric™ is utilized as a foundation for the consensus and security protocols of the framework in some embodiments. Since Hyperledger Fabric™ is a private and permissioned blockchain platform, blockchain ledgers are not visible to the public and network participants must have trusted identities associated with authorized organizations. Data and transaction privacy on the blockchain network are made possible with the use of "channels," or subnetworks within the Hyperledger Fabric™ network. A channel allows its participants to conduct private and confidential transactions. Hence, data and transactions from one channel are kept private from other channels. Organizations can be given access to channels to use their ledgers and make transactions. In a channel, smart contracts are used as transaction protocols to govern how transactions are carried out. Both which transactions can be made and who has permission to conduct the transactions can be governed using these smart contracts.

Figure 4:
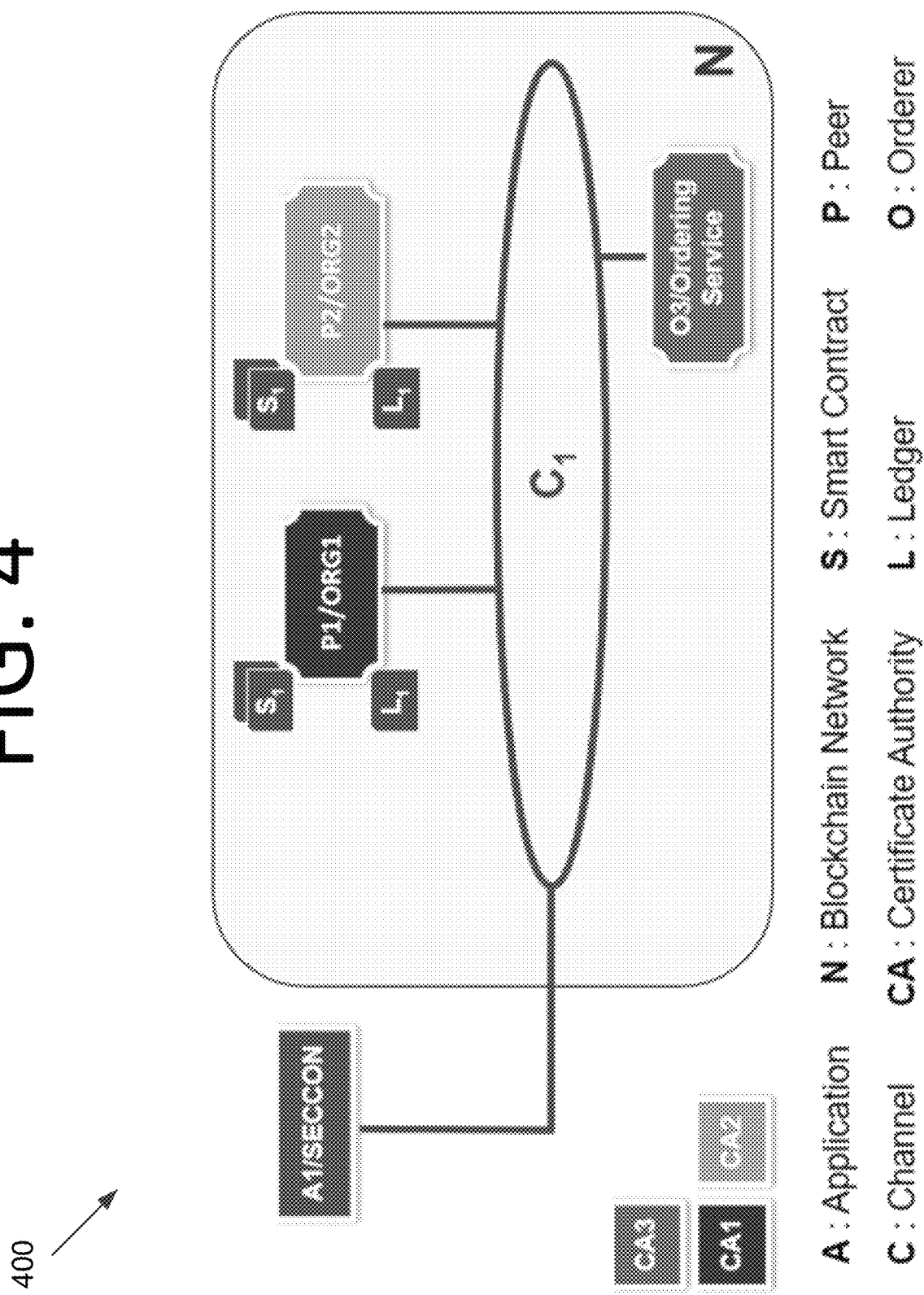
FIG. 4 is an architectural diagram illustrating a blockchain network for SECCON, according to an embodiment of the present invention.

Some embodiments of the framework provide secure constellation configuration management (SECCON). FIG. 4 is an architectural diagram illustrating a SECCON framework 400. The network (N) includes one application (A1), three organizations (Org1, Org2, and Org3), three Certificate Authorities (CA1, CA2, and CA3), one channel (Cl), one unique ledger (L1), one smart contract (S1), two peer nodes (P1 and P2), and one orderer node (O3). Descriptions of each network element are as follows:

Application (A) is the SECCON web application that allows authorized users to perform blockchain transactions.

Certificate Authority (CA) is used to issue certificates to administrators and users for organizations. This is an important part of the permissioned blockchain. In this example, each organization has its own CA, although this may not be the case in some embodiments.

Channel (C) is a subnetwork that allows users to conduct private and confidential transactions.

Ledger (L) contains current blockchain data and a history of transactions.

Smart Contract (S) is the transaction protocol used to govern which transaction(s) can be performed and by whom.

Peer (P) is a fundamental element of the network that hosts ledgers and smart contracts. In this case, peer nodes P1 and P2 each host a copy of ledger L1 and both have smart contract S1 installed.

Orderer (O) is another fundamental element of the network that supports transaction ordering rather than performing transactions.

The SECCON application in this example includes two organizations (Org1 and Org2) that can perform transactions. Because both organizations have the same copy of ledger L1, all satellite configuration data stored on L1 can be viewed by authorized users from both organizations. In other words, no one other than authorized users from Org1 and Org2 has access to data on L1. Data access control is implemented in smart contract S1 to allow only users from a certain organization (e.g., Org1) to manage satellite configuration data. Transactions made within the blockchain are immutable, meaning that the transaction records cannot be modified or deleted. Therefore, SECCON uses this to its advantage for the historical tracking of data.

On top of blockchain security, data stored on the blockchain is also encrypted. Data encryption has been implemented for SECCON in this embodiment to ensure that satellite configuration data is encrypted before it is stored on the blockchain. This further enhances data storage security. The encryption algorithm used in some embodiments is the Advanced Encryption Standard algorithm with 256-bit keys (AES-256). According to the National Security Agency (NSA), AES-256 encryption algorithm can be used to protect data up to top secret level. However, any suitable security protocol may be used without deviating from the scope of the invention. Counter mode encryption may be used for SECCON in some embodiments and is suitable for low bandwidth traffic. When data is encrypted, satellite configuration information cannot be accessed without the encryption key. When the user signs into SECCON, the identity of the user is authenticated by both the IdAM solution and the Hyperledger Fabric™ network before the satellite configuration data is decrypted and displayed to the user. Hyperledger Fabric™ network 330 is also dynamically configurable for different applications. In contrast to FIG. 4, an organization could have multiple or many ledgers in a blockchain network based on application needs.

Interfacing SECCON with 3D Visualization and Analysis Software 3D visualization and analysis software, such as SOAP, may provide visualization for space assets, such as satellites, ground stations, vehicles, aircraft, and planets. SOAP provides rich, real-time graphics on a user-defined display. The display provides configurable options to the user, such as texture-mapped planets, atmospheric rendering, spacecraft orbit planes, trajectories, star maps, and many more. Various views can be created for different projections through the display as desired.

Figure 5:
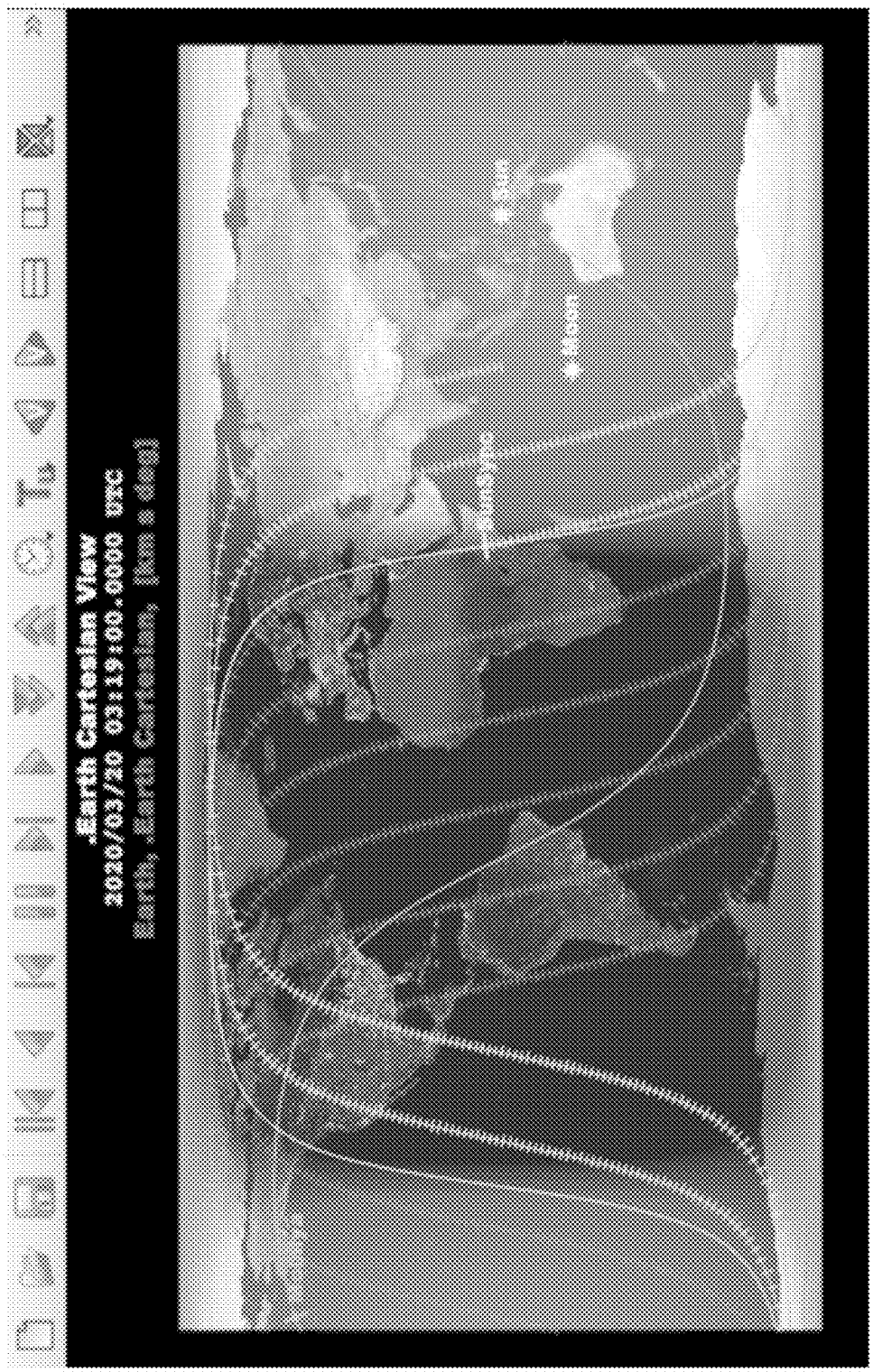
FIG. 5 is a screenshot illustrating the Satellite Orbit Analysis Program (SOAP) ground track view.

SOAP also provides statistical views to show data, plots, or reports. See screenshot 500 of FIG. 5. These views can be interacted with by rotating and zooming for detailed examination of records. SOAP allows for the presentation of these different views. Users can create slideshows of the views through its simulation start time and time step feature. These slides can demonstrate different scenarios and present statistical information for better understanding.

Since SECCON was constructed as a tool for securely storing satellite configurations, integrating SECCON with SOAP provides various benefits. For instance, SOAP provides a mechanism to display the stored configuration data in relation to other satellites and spacecraft. SECCON in some embodiments stores multiple satellite configuration parameters that are to be used in SOAP. The following SOAP parameters were used in a SECCON embodiment:

Sensor type: The geometry option of the satellite sensor. Sensor types include conical, spherical, and none.

Sensor range: The maximum distance away from the sensor where a target is in the sensor's field of view (or can be detected).

Inclination: An angle that an orbital plane is tilted in relation to the Earth's equator.

Right Ascension of the Ascending Node (RAAN): An angle that describes the orbital orientation with respect to the principal direction (or a direction that the satellite is moving in).

Eccentricity: The shape of an orbit (circular, elliptical, or hyperbolic).

Argument of Perigee: An angle from the ascending node to the perigee. The perigee is a point in the orbit where a satellite is closest to the Earth.

Mean Anomaly: The location of the satellite in an orbit.

Mean Motion: An angular velocity of the satellite averaged over one orbital period.

Revolution Number: The number of periods since the satellite was launched.

These attributes can be exported through the SECCON client as an .orb file to be viewed in SOAP in some embodiments. The attributes may be passed into SOAP as orbital parameters. SOAP takes these parameters and displays them graphically through its user display. The user can then interact with the display to see how the satellite behaves in real-time.

Figure 6:
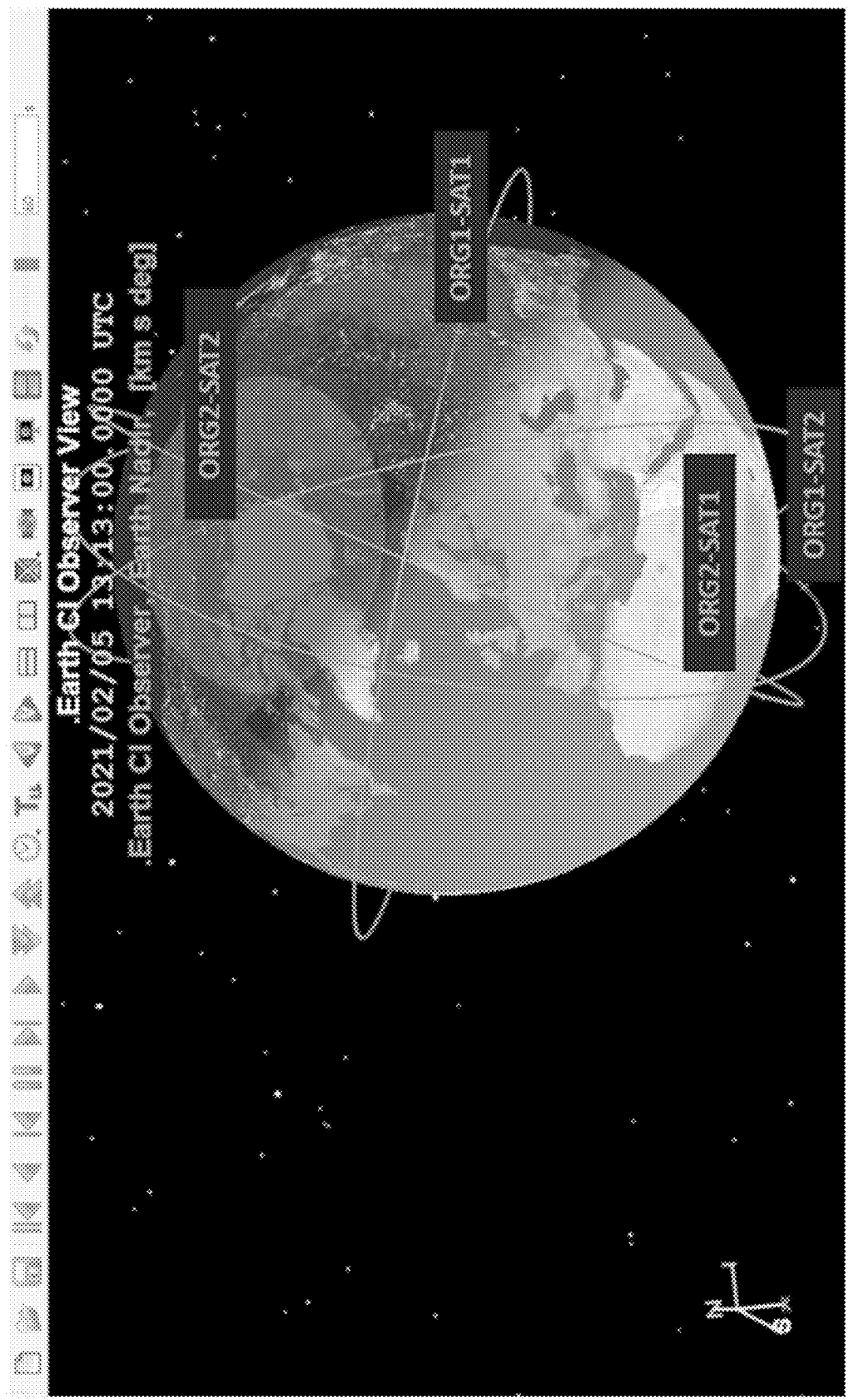
FIG. 6 is a screenshot illustrating example SECCON configurations in SOAP, according to an embodiment of the present invention.

This functionality beneficially allows the users to see satellite placement and performance. If changes need to be made to the satellite, the user can configure these changes through SOAP to see how the satellite would behave before saving the changes to the blockchain. Also, since there are multiple satellite configurations that are saved within SECCON in some embodiments, the user can export all satellites together. In doing so, the user would be able to compare configurations of each satellite with one another. See screenshot 600 of FIG. 6. This provides support for modifying configuration changes of a satellite in relation to one or more constellations of satellites.

Interfacing SECCON with Flight Control Software

Any suitable flight control software may be used without deviating from the scope of the invention. Per the above, some embodiments use OpenSatKit (OSK), which is an open-source desktop program for learning how to use NASA's open-source flight software platform—the core Flight System (cFS). OSK includes three components: (1) NASA's cFS; (2) Ball Aerospace's command and control system called COSMOS; and (3) a NASA dynamic simulator called 42. For the purposes of this application, cFS and COSMOS are discussed below.

cFS is a generic flight software architecture framework that represents a single virtual satellite and can be extended to fit specific mission applications. The goal of cFS is to provide reusable flight software applications that reduce in program schedule time and cost while providing high quality flight software. cFS has been used on several operational NASA Class B missions and is highly reliable. cFS can be ported to spacecraft, CubeSats, Raspberry Pi, and other platforms. For the purpose of interfacing a blockchain with the OSK, the kit and its software run on a Linux® computer in some embodiments.

Figure 7:
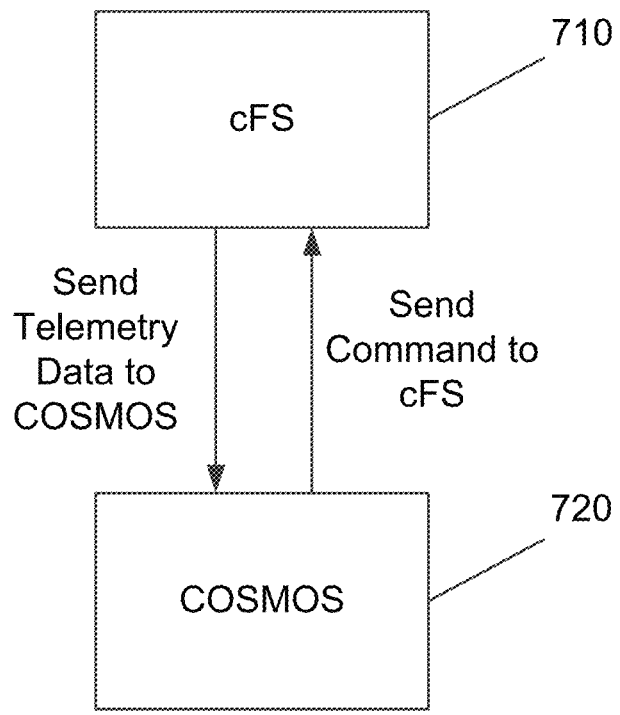
FIG. 7 is an architectural diagram illustrating operation of cFS and COSMOS in OpenSatKit (OSK).

COSMOS is a graphical user interface for command and control of embedded systems. In the context of OSK, cFS is used as a virtual satellite and COSMOS is used as a ground system. To communicate with cFS, COSMOS uses a client-server architecture to send commands to and receive telemetry data from cFS. In summary, OSK allows for inexperienced teams to learn about the cFS through the support of COSMOS. See OSK architecture 700 of FIG. 7. In some embodiments, SECCON only uses the COSMOS command and telemetry server, which allows COSMOS to send commands to cFS and allows cFS to send telemetry data to COSMOS.

Integrating SECCON with OSK provides various advantages. For instance, such integration showcases the blockchain's capability to integrate with a satellite command and control system, which could potentially allow for integration with an actual ground system. Also, it demonstrates the blockchain's immutable transactions to securely track ground commands sent to satellites. Since the history of the blockchain transactions is unmodifiable, these transaction records may further be used for detecting bad actors. In one use case, if a bad actor is able to hack into an authenticated user account and successfully perform transactions, any actions performed by the bad actor will be recorded on the blockchain ledgers.

Figure 8:
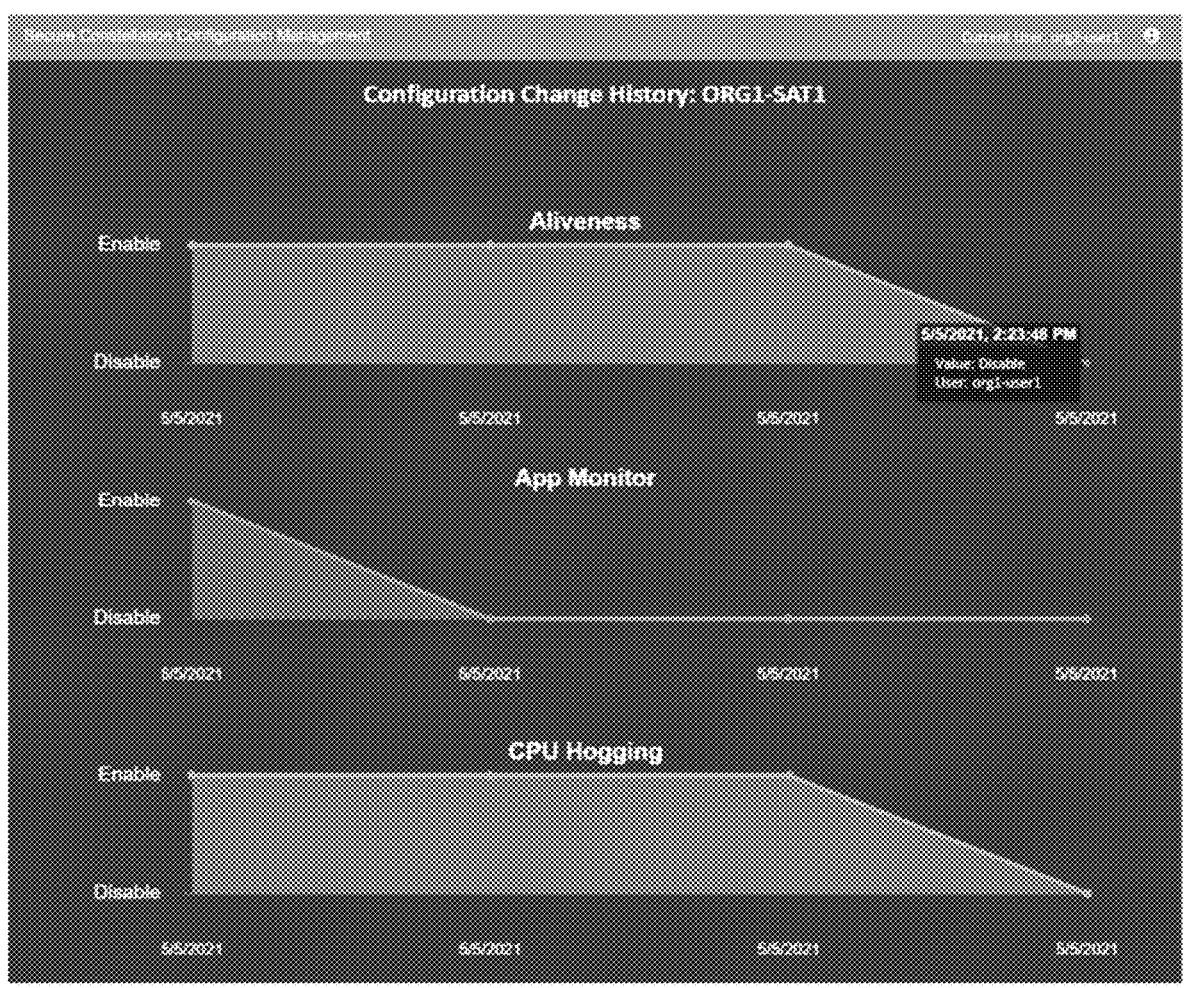
FIG. 8 is a screenshot illustrating an example SECCON configuration change history, according to an embodiment of the present invention.

Authenticated users may view satellite data from the blockchain to obtain information regarding which satellite configuration parameters were changed, when the changes were made, and which account was used to make the changes, for example. By knowing who, what, and when regarding the unauthorized configuration changes, the impact of the incident can later be assessed. FIG. 8 shows a graphical example of a SECCON configuration change history 800 for OSK parameters. A user can hover over a data point to get a detailed information about a particular transaction.

SECCON may allow authorized users to modify the following OSK health and safety parameters in some embodiments:

Enable/Disable Aliveness Indicator: The CPU aliveness indicator will, if enabled (either by command message or by configuration parameter), continuously output a software heartbeat (a character or string), to give an indication that the system is running.

Enable/Disable Critical Application Monitor: The application monitor detects whether an application is running, and perform action as needed for the state of an application.

Enable/Disable CPU Hogging Indicator: The CPU hogging indicator indicates how much CPU time is not in use, which could be allocated towards desired tasks.

Figure 9:
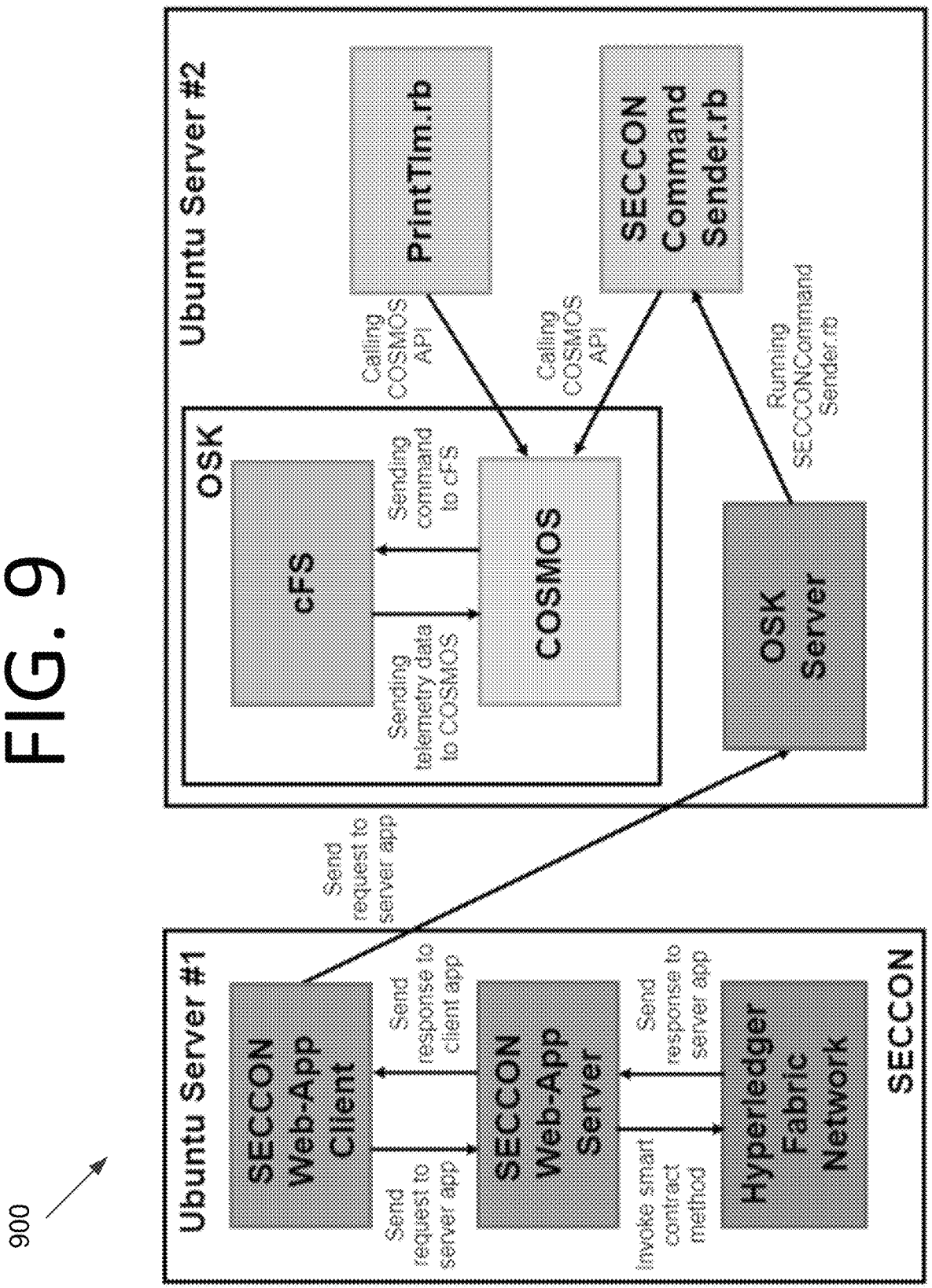
FIG. 9 is an architectural diagram illustrating an architecture for interfacing SECCON with a single OSK application, according to an embodiment of the present invention.

FIG. 9 is an architectural diagram illustrating an architecture 900 for interfacing SECCON with a single OSK application, according to an embodiment of the present invention. This configuration represents the interface of SECCON and one virtual satellite since there is only one OSK (and therefore one cFS). Both applications, SECCON and OSK, may be installed and run on the same server in some embodiments. However, in FIG. 9, SECCON and OSK are running on separate Ubuntu Linux® machines. OSK is downloaded and installed as is without any code modifications in some embodiments. Since SECCON could not interface with COSMOS tools directly, the COSMOS application programming interface (API) was leveraged for communicating with cFS. COSMOS APIs can be called using Ruby scripts to execute command and telemetry functions. SECCONCommandSender.rb is used to send configuration change command to cFS. The input argument for this script is the command to be sent. PrintTlm.rb is used to print telemetry data from cFS on the command prompt. The printed telemetry data may be used to verify whether the configuration change command is sent to cFS successfully. This script was called manually for verification purposes.

To enable the data flow from SECCON to OSK, a Node.js server application called "OSK Server" is used. The objective of the OSK server is to receive the satellite configuration data from the client application, format the command, pass the command to the SECCONCommandSender.rb, and execute the Ruby script.

Data flow from SECCON to the OSK can be summarized as follows. When an authorized user modifies satellite configuration data, the SECCON web application client sends a Hypertext Transfer Protocol (HTTP) request to the SECCON web application server to modify the satellite configurations. The SECCON web application server provides the user's wallet, which contains the user's identity generated by a CA, to the Hyperledger Fabric™ network. The Hyperledger Fabric™ smart contract method is invoked to change the satellite configurations.

The smart contract method first checks if the user has the permission to change the satellite configurations. Only the user from the owner organization of the satellite is allowed to make the changes. The smart contract can either reject or approve the changes. If the changes are approved, the new configuration data will be verified and stored on the blockchain ledgers. If the changes are rejected, there will be no changes made to the blockchain.

The response from the smart contract is sent back to the SECCON web application server, which forwards the response back to the SECCON web application client. The SECCON web application client displays the response that was received to the user. If the changes are approved, the client displays the updated configurations to the user, and also sends an HTTP request to the OSK server to modify the configuration data on the virtual satellite (or the cFS).

The OSK server formats a command based on the selected satellite parameters and values. The OSK server then executes the SECCONCommandSender.rb with the formatted command as the input argument. The SECCONCommandSender.rb calls the COSMOS cmd( ) function to send the command to the cFS.

Figure 10:
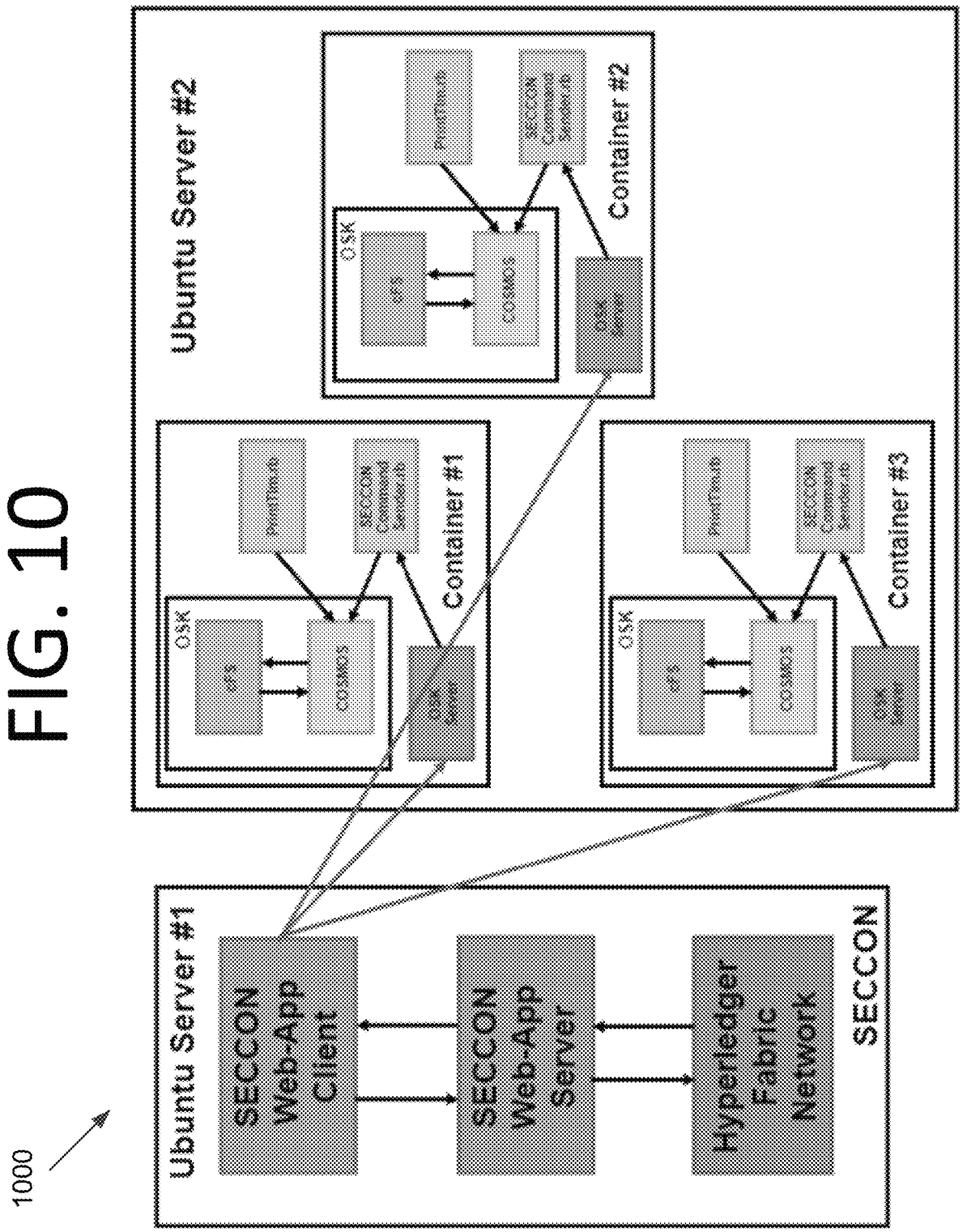
FIG. 10 is an architectural diagram illustrating an architecture for interfacing SECCON with a multiple OSK applications, according to an embodiment of the present invention.

Since SECCON is used for managing configuration data of the constellation of satellites rather than a single satellite, some modifications are made to FIG. 9 to support multiple OSK applications. Because the OSK application only represents one satellite, multiple OSK applications are used for SECCON to interface with multiple satellites. FIG. 10 is an architectural diagram illustrating an architecture 1000 for interfacing SECCON with a multiple OSK applications, according to an embodiment of the present invention. In FIG. 10, three OSK applications are used instead of one.

To run multiple OSK applications on the same computing system, various configuration files would be modified to ensure that each OSK application is hosted on different port numbers. This is difficult to accomplish because some port numbers are dynamic rather than static. Therefore, a Docker® image of the OSK is created in some embodiments. The OSK Docker® image contains OSK, Ruby scripts, the OSK server application, and other dependencies, such as cURL, Docker®, Node.js, npm, etc. By having the OSK server application inside the Docker® image, OSK port numbers do not need to be exposed to the host Linux® computing system since only the OSK server's port number is needed. In this manner, multiple instances of OSK can readily be generated from the Docker® image.

Interfacing the Blockchain with Space Applications

Based on SECCON integration with SOAP and OSK, there are two main ways to interface with Hyperledger Fabric™. One is to export blockchain data to a file. Another is to send and/or receive blockchain data using a client-server architecture. Regardless of which method is chosen, one or more applications for communicating with and querying data from the blockchain should be provided. As discussed above, the web application client and web application server perform this task in some embodiments.

To interface with existing applications using the first method, one can modify the web application client to add an option for exporting data into a file with an appropriate format. The file can then be imported to external applications for use. For example, to interface with SOAP, blockchain data can be exported to an .orb file, which is later read into SOAP to display satellite constellations.

To use the second method, an additional server application should be created that can receive blockchain data and interface with external applications. SECCON integration with OSK is a good example of this. In this context, the additional server application is the OSK server that is configured to receive data from the SECCON web application client. Additionally, the OSK server performs the task of appropriately formatting the data and sending it to OSK.

Figure 11:
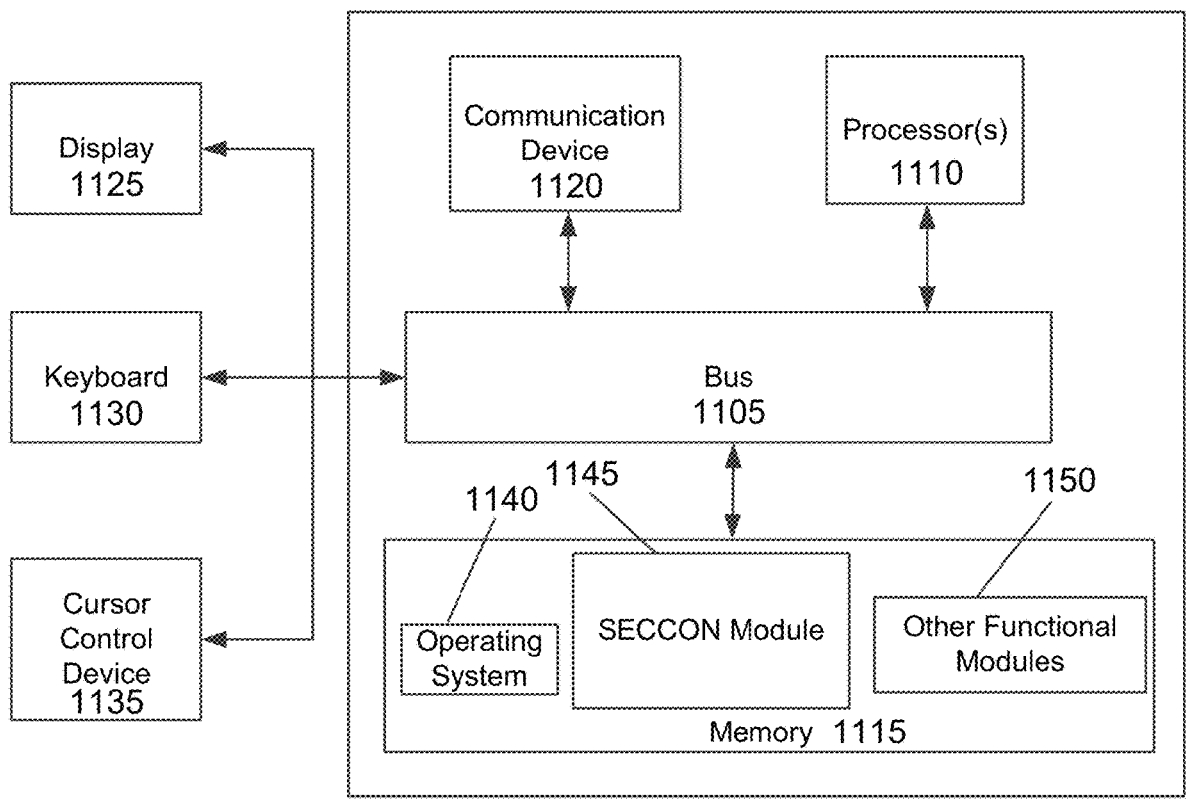
FIG. 11 is an architectural diagram illustrating a computing system configured to provide part of the functionality for an SECCON framework, according to an embodiment of the present invention.

FIG. 11 is an architectural diagram illustrating a computing system 1100 configured to provide part of the functionality for an SECCON framework, according to an embodiment of the present invention. In some embodiments, computing system 1100 may be one or more of the computing systems depicted and/or described herein. Computing system 1100 includes a bus 1105 or other communication mechanism for communicating information, and processor(s) 1110 coupled to bus 1105 for processing information. Processor(s) 1110 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1110 may also have multiple processing cores, and at least some of the cores may be configured to perform specific functions. Multi-parallel processing may be used in some embodiments. In certain embodiments, at least one of processor(s) 1110 may be a neuromorphic circuit that includes processing elements that mimic biological neurons. In some embodiments, neuromorphic circuits may not require the typical components of a Von Neumann computing architecture.

Computing system 1100 further includes a memory 1115 for storing information and instructions to be executed by processor(s) 1110. Memory 1115 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 1110 and may include volatile media, non-volatile media, or both. The media may also be removable, non-removable, or both. Computing system 1100 includes a communication device 1120, such as a transceiver, to provide access to a communications network via a wireless and/or wired connection. In some embodiments, communication device 1120 may include one or more antennas that are singular, arrayed, phased, switched, beamforming, beamsteering, a combination thereof, and or any other antenna configuration without deviating from the scope of the invention.

Processor(s) 1110 are further coupled via bus 1105 to a display 1125. Any suitable display device and haptic I/O may be used without deviating from the scope of the invention. A keyboard 1130 and a cursor control device 1135, such as a computer mouse, a touchpad, etc., are coupled to bus 1105 to enable a user to interface with computing system 1100. However, in certain embodiments, a physical keyboard and mouse may not be present, and the user may interact with the device solely through display 1125 and/or a touchpad (not shown). Any type and combination of input devices may be used as a matter of design choice. In certain embodiments, no physical input device and/or display is present. For instance, the user may interact with computing system 1100 remotely via another computing system in communication therewith, or computing system 1100 may operate autonomously.

Memory 1115 stores software modules that provide functionality when executed by processor(s) 1110. The modules include an operating system 1140 for computing system 1100. The modules further include a SECCON module 1145 that is configured to perform all or part of the processes described herein or derivatives thereof. Computing system 1100 may include one or more additional functional modules 1150 that include additional functionality.

One skilled in the art will appreciate that a "computing system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

FIG. 12 is a flowchart illustrating a process 1200 for interfacing a blockchain-based ground system with flight software and satellite orbit analysis applications, according to an embodiment of the present invention. The process begins with displaying an interface for secure viewing and management of satellite configurations by a web application client at 1205. The interface includes satellite configuration data. Communication is facilitated between the web client application and a blockchain ledger application by a web server application at 1210. Secure management and storage of satellite configuration data is provided on one or more blockchain ledgers by the blockchain ledger application at 1215.

After a user modifies the satellite configuration data, a request is sent from the web application client to the web application server to modify a satellite configuration at 1220. A wallet including an identity for the user generated by a certificate authority is provided and sent to the blockchain ledger application by the web application server at 1225. Prior to changing the satellite configuration, the smart contract method checks whether the user has permission to change the satellite configuration at 1230.

If the user has permission at 1235, the changes to the satellite configuration are approved at 1240. However, if the user does not have permission, the changes to the satellite configuration are rejected at 1285. The blockchain ledger application then invokes a smart contract method to change the satellite configuration at 1245. The satellite configuration data is verified and stored on the one or more blockchain ledgers by the blockchain ledger application at 1250. A response is sent from the smart contract to the web application server by the blockchain ledger application at 1255. The response is then forwarded to the web application client by the web application server at 1260. The user is informed that the satellite configuration change was approved by the web application client at 1265.

The web application client sends one or more commands for controlling a satellite based on the satellite configuration changes to a satellite control application server at 1270. The satellite control application server receives the one or more commands from the web application client for controlling the satellite, formats the one or more commands based on satellite parameters and values in the one or more commands into an API call to a command and control system, sends the API call to the command and control software, and sends a command to a satellite flight control application to control the satellite at 1275. The satellite is then provided with the commands and the satellite configuration changes are made at 1280.

Figure 12A:
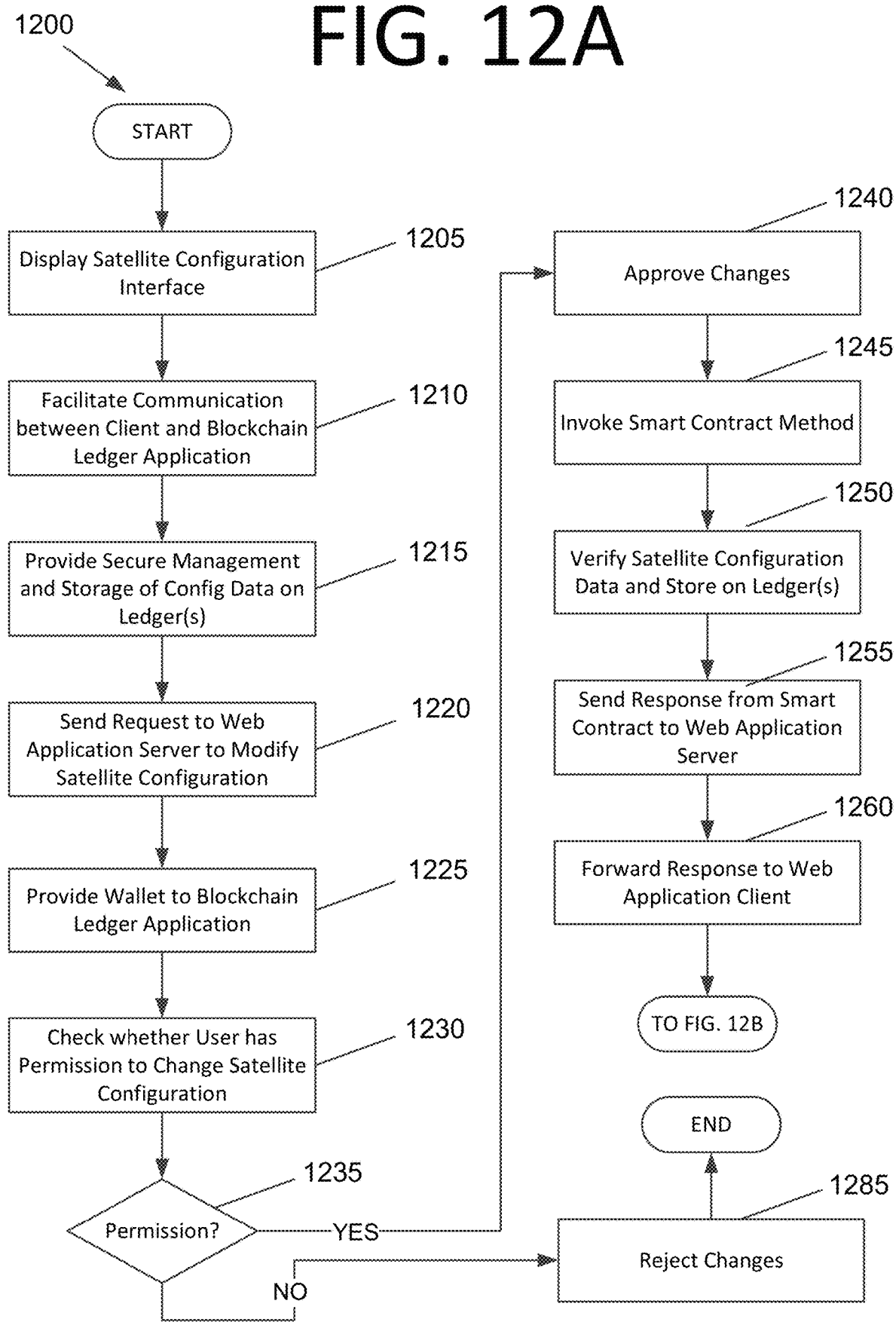

The process steps performed in FIGS. 12A and 12B may be performed by a computer program, encoding instructions for the processor(s) to perform at least part of the process(es) described in FIGS. 12A and 12B, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 1110 of computing system 1100 of FIG. 11) to implement all or part of the process steps described in FIGS. 12A and 12B, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
a first computing system, comprising:
memory storing computer program instructions for a web application client, a web application server, and a blockchain ledger application, and
at least one processor configured to execute the computer program instructions, wherein the computer program instructions are configured to cause the at least one processor to:
display, by the web application client, an interface for secure viewing and management of satellite configurations, the interface comprising satellite configuration data,
facilitate communication between the web client application and the blockchain ledger application, by the web server application,
provide secure management and storage of satellite configuration data on one or more blockchain ledgers, by the blockchain ledger application,
after a user modifies the satellite configuration data, send a request to the web application server to modify a satellite configuration, by the web application client,
provide a wallet comprising an identity for the user generated by a certificate authority and send the wallet to the blockchain ledger application, by the web application server,
invoke a smart contract method to change the satellite configuration, by the blockchain ledger application,
prior to changing the satellite configuration, check, by the smart contract method, whether the user has permission to change the satellite configuration,
approve the changes to the satellite configuration when the user has permission, and
reject the changes to the satellite configuration when the user does not have permission.

2. The system of claim 1, wherein the computer program instructions are further configured to cause the at least one processor of the first computing system to:
verify and store the satellite configuration data on the one or more blockchain ledgers, by the blockchain ledger application.

3. The system of claim 1, wherein the computer program instructions are further configured to cause the at least one processor of the first computing system to:
send a response from the smart contract to the web application server, by the blockchain ledger application;
forward the response to the web application client, by the web application server; and
inform the user that the satellite configuration change was approved, by the web application client.

4. The system of claim 1, wherein the computer program instructions are further configured to cause the at least one processor of the first computing system to:
send, by the web application client, one or more commands for controlling a satellite based on the satellite configuration changes to a satellite control application server.

5. The system of claim 1, further comprising:
a second computing system, comprising:
memory storing computer program instructions for a satellite control application server, and
at least one processor configured to execute the computer program instructions, wherein the computer program instructions are configured to cause the at least one processor to:
receive the one or more commands from the web application client for controlling the satellite, by the satellite control application server, format the one or more commands based on satellite parameters and values in the one or more commands into an application programming interface (API) call to a command and control system, send the API call to the command and control software, by the satellite control application server, and send a command to a satellite flight control application to control the satellite, by the command and control software.

6. The system of claim 5, wherein the second computing system comprises a plurality of containers, each container comprising a satellite control application server, and each satellite control application server is configured to control a respective satellite.

7. A computing system, comprising:

memory storing computer program instructions for a web application client, a web application server, and a blockchain ledger application, and at least one processor configured to execute the computer program instructions, wherein the computer program instructions are configured to cause the at least one processor to:

display, by the web application client, an interface for secure viewing and management of satellite configurations, the interface comprising satellite configuration data, facilitate communication between the web client application and the blockchain ledger application, by the web server application, provide secure management and storage of satellite configuration data on one or more blockchain ledgers, by the blockchain ledger application, after a user modifies the satellite configuration data, send a request to the web application server to modify a satellite configuration, by the web application client, provide a wallet comprising an identity for the user generated by a certificate authority and send the wallet to the blockchain ledger application, by the web application server, invoke a smart contract method to change the satellite configuration, by the blockchain ledger application, prior to changing the satellite configuration, check, by the smart contract method, whether the user has permission to change the satellite configuration, approve the changes to the satellite configuration when the user has permission, and reject the changes to the satellite configuration when the user does not have permission.

8. The computing system of claim 7, wherein the computer program instructions are further configured to cause the at least one processor to:

verify and store the satellite configuration data on the one or more blockchain ledgers, by the blockchain ledger application.

9. The computing system of claim 7, wherein the computer program instructions are further configured to cause the at least one processor to:

send a response from the smart contract to the web application server, by the blockchain ledger application;

forward the response to the web application client, by the web application server; and inform the user that the satellite configuration change was approved, by the web application client.

10. The computing system of claim 7, wherein the computer program instructions are further configured to cause the at least one processor to:

send, by the web application client, one or more commands for controlling a satellite based on the satellite configuration changes to a satellite control application server.

11. The computing system of claim 10, wherein the computer program instructions are configured to send commands to a plurality of satellite control application servers, and each satellite control application server is configured to control a respective satellite.

12. A non-transitory computer-readable medium storing computer program code, the computer program code configured to cause at least one processor to:

display an interface of a web application client for secure viewing and management of satellite configurations, the interface comprising satellite configuration data;

facilitate communication via a web server application between the web client application and a blockchain ledger application;

provide secure management and storage of satellite configuration data on one or more blockchain ledgers via the blockchain ledger application after a user modifies the satellite configuration data, send a request to the web application server via the web application client to modify a satellite configuration;

provide, via the web application server, a wallet comprising an identity for the user generated by a certificate authority and send the wallet to the blockchain ledger application;

invoke a smart contract method to change the satellite configuration, via the blockchain ledger application prior to changing the satellite configuration, checking, by the smart contract method, whether the user has permission to change the satellite configuration;

approve the changes to the satellite configuration when the user has permission; and reject the changes to the satellite configuration when the user does not have permission.

13. The non-transitory computer-readable medium of claim 12, wherein the computer program code is further configured to cause the at least one processor to:

verify and store the satellite configuration data on the one or more blockchain ledgers, via the blockchain ledger application.

14. The non-transitory computer-readable medium of claim 12, wherein the computer program code is further configured to cause the at least one processor to:

send a response from the smart contract to the web application server, via the blockchain ledger application;

forward the response to the web application client, via the web application server; and inform the user that the satellite configuration change was approved, via the web application client.

15. The non-transitory computer-readable medium of claim 12, wherein the computer program code is further configured to cause the at least one processor to:

send, via the web application client, one or more commands for controlling a satellite based on the satellite configuration changes to a satellite control application server.

16. The non-transitory computer-readable medium of claim 15, wherein
the computer program code is configured to send commands to a plurality of satellite control application servers, and
each satellite control application server is configured to control a respective satellite.

17. The system of claim 1, wherein responsive to the modification to the satellite configuration data being approved via the blockchain ledger application, the computer program instructions are further configured to cause the at least one processor to:
display, by a web application client, an updated configuration to the user; and
send, by a web application client, a request to flight control software to modify configuration data on a satellite with the updated configuration.

18. The computing system of claim 7, wherein responsive to the modification to the satellite configuration data being approved via the blockchain ledger application, the computer program instructions are further configured to cause the at least one processor to:
display, by a web application client, an updated configuration to the user; and
send, by a web application client, a request to flight control software to modify configuration data on a satellite with the updated configuration.

19. The non-transitory computer-readable medium of claim 12, wherein responsive to the modification to the satellite configuration data being approved via the blockchain ledger application, the computer program code is further configured to cause the at least one processor to:
display, by a web application client, an updated configuration to the user; and
send, by a web application client, a request to flight control software to modify configuration data on a satellite with the updated configuration.

* * * * *